(12) United States Patent
Liu

(10) Patent No.: US 11,460,953 B2
(45) Date of Patent: *Oct. 4, 2022

(54) NOISE SUPPRESSION CIRCUIT

(71) Applicant: Synaptics Incorporated, San Jose, CA (US)

(72) Inventor: Chunbo Liu, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/341,124

(22) Filed: Jun. 7, 2021

(65) Prior Publication Data

US 2021/0294454 A1 Sep. 23, 2021

Related U.S. Application Data

(63) Continuation of application No. 16/373,369, filed on Apr. 2, 2019, now Pat. No. 11,054,942.

(60) Provisional application No. 62/653,331, filed on Apr. 5, 2018.

(51) Int. Cl.
*G06F 3/041* (2006.01)
*G06F 3/044* (2006.01)
*G06F 3/0354* (2013.01)

(52) U.S. Cl.
CPC ............ *G06F 3/0418* (2013.01); *G06F 3/044* (2013.01); *G06F 3/03545* (2013.01); *G06F 2203/04104* (2013.01)

(58) Field of Classification Search
CPC .... G06F 3/0418; G06F 3/044; G06F 3/03545; G06F 2203/04104; G06F 3/04182; G06F 1/182; G06F 3/0416; G06F 3/045
See application file for complete search history.

(56) References Cited

U.S. PATENT DOCUMENTS

| | | |
|---|---|---|
| 8,610,443 B1 | 12/2013 | Ryshtun et al. |
| 9,268,441 B2 | 2/2016 | Walsh et al. |
| 9,983,732 B2 | 5/2018 | Ahn et al. |
| 2007/0074913 A1 | 4/2007 | Geaghan et al. |
| 2008/0111714 A1 | 5/2008 | Kremin |
| 2008/0157893 A1 | 7/2008 | Krah |
| 2008/0309628 A1 | 12/2008 | Krah et al. |
| 2009/0009483 A1 | 1/2009 | Hotelling et al. |

(Continued)

*Primary Examiner* — Hong Zhou
(74) *Attorney, Agent, or Firm* — Ferguson Braswell Fraser Kubasta PC

(57) ABSTRACT

A processing system is disclosed. The processing system includes an amplifier including a multitude of input resistors receiving a multitude of reduced noise signals from a multitude of charge integrators and a summing resistor at an output of the amplifier. The amplifier is configured to generate a feedback signal at the output of the amplifier by amplifying each of a multitude of reduced noise signals using a gain value and a cardinality of the multitude of reduced noise signals. The multitude of charge integrators is configured to obtain a multitude of resulting signals from a multitude of capacitive sensor electrodes coupled to a noise source and generate the multitude of reduced noise signals by mitigating noise in the multitude of the resulting signals, at the multitude of charge integrators, using the feedback signal. Resistances of the multitude of input resistors, a resistance of the summing resistor, and the gain values are selected to mitigate the noise.

20 Claims, 4 Drawing Sheets

(56) References Cited

U.S. PATENT DOCUMENTS

| | | |
|---|---|---|
| 2009/0244014 A1 | 10/2009 | Hotelling et al. |
| 2010/0060610 A1 | 3/2010 | Wu |
| 2010/0085322 A1 | 4/2010 | Mamba et al. |
| 2011/0063993 A1 | 3/2011 | Wilson et al. |
| 2011/0163992 A1 | 7/2011 | Cordeiro et al. |
| 2012/0049868 A1 | 3/2012 | Maharyta |
| 2012/0139846 A1 | 6/2012 | Krah et al. |
| 2012/0256868 A1 | 10/2012 | Choi et al. |
| 2013/0021294 A1 | 1/2013 | Maharyta et al. |
| 2013/0063395 A1 | 3/2013 | Byun et al. |
| 2013/0063396 A1 | 3/2013 | Kim et al. |
| 2013/0278538 A1 | 10/2013 | Brunet et al. |
| 2013/0300692 A1 | 11/2013 | Jang et al. |
| 2013/0314109 A1 | 11/2013 | Kremin et al. |
| 2014/0333368 A1 | 11/2014 | Bell et al. |
| 2014/0368467 A1 * | 12/2014 | Park .................... G06F 3/0446 345/174 |
| 2015/0048846 A1 | 2/2015 | Post et al. |
| 2015/0062080 A1 | 3/2015 | Kang |
| 2015/0293636 A1 | 10/2015 | Park et al. |
| 2016/0026295 A1 | 1/2016 | Ogirko et al. |
| 2016/0054829 A1 | 2/2016 | Ellis et al. |
| 2016/0092026 A1 | 3/2016 | Stevenson et al. |
| 2016/0334902 A1 | 11/2016 | Li et al. |
| 2017/0075472 A1 * | 3/2017 | Min .................... G06F 3/04182 |
| 2017/0083161 A1 | 3/2017 | Jain et al. |
| 2017/0212599 A1 | 7/2017 | Sharma |
| 2017/0212619 A1 | 7/2017 | Sharma |
| 2017/0285862 A1 | 10/2017 | Hu et al. |
| 2018/0004317 A1 | 1/2018 | Bohannon et al. |
| 2018/0253184 A1 | 9/2018 | Imanilov |
| 2018/0253185 A1 | 9/2018 | Imanilov |
| 2018/0329555 A1 | 11/2018 | Kim et al. |
| 2018/0329573 A1 | 11/2018 | Liu et al. |
| 2019/0149163 A1 | 5/2019 | Bohannon |

* cited by examiner

NOISE SUPPRESSION CIRCUIT

CROSS-REFERENCE TO RELATED APPLICATIONS

This application is a continuation of and claims the benefit of priority under 35 U.S.C. § 120 to U.S. patent application Ser. No. 16/373,369, filed on Apr. 2, 2019, which claims priority under 35 U.S.C. § 119(e) to U.S. Provisional Application No. 62/653,331, filed on Apr. 5, 2018, having at least one of the same inventors as the present application, and entitled, "NOISE SUPPRESSION CIRCUIT". U.S. Provisional Application No. 62/653,331 and U.S. patent application Ser. No. 16/373,369 are incorporated herein by reference.

TECHNICAL FIELD

The described embodiments relate generally to electronic devices, and more specifically, to suppressing noise (e.g., display noise) associated with touch sensor electrodes.

BACKGROUND

Input devices, including proximity sensor devices (e.g., touchpads or touch sensor devices), are widely used in a variety of electronic systems. A proximity sensor device may include a sensing region, often demarked by a surface, in which the proximity sensor device determines the presence, location and/or motion of one or more input objects. Proximity sensor devices may be used to provide interfaces for the electronic system. For example, proximity sensor devices may be used as input devices for larger computing systems (e.g., opaque touchpads integrated in, or peripheral to, notebook or desktop computers). Proximity sensor devices are also often used in smaller computing systems (e.g., touch screens integrated in cellular phones). Proximity sensor devices may also be used to detect input objects (e.g., finger, styli, pens, fingerprints, etc.).

SUMMARY

In general, in one aspect, one or more embodiments relate to a processing system comprising: an amplifier comprising: a plurality of input resistors receiving a plurality of reduced noise signals from a plurality of charge integrators; and a summing resistor at an output of the amplifier, the amplifier configured to generate a feedback signal at the output of the amplifier by amplifying each of a plurality of reduced noise signals using a gain value and a cardinality of the plurality of reduced noise signals, and the plurality of charge integrators configured to obtain a plurality of resulting signals from a plurality of capacitive sensor electrodes coupled to a noise source and generate the plurality of reduced noise signals by mitigating noise in the plurality of the resulting signals, at the plurality of charge integrators, using the feedback signal, wherein resistances of the plurality of input resistors, a resistance of the summing resistor, and the gain values are selected to mitigate the noise.

In general, in one aspect, one or more embodiments relate to a method, comprising: generating, by an amplifier, a feedback signal by amplifying each of a plurality of reduced noise signals based on a gain value and a cardinality of the plurality of reduced noise signals; obtaining a plurality of resulting signals from a plurality of capacitive sensor electrodes coupled to a noise source; and generating, by a plurality of charge integrators, the plurality of reduced noise signals by mitigating noise in the plurality of resulting signals using the feedback signal, wherein the amplifier comprises: a plurality of input resistors receiving the plurality of reduced noise signals from the plurality of charge integrators; and a summing resistor at an output of the amplifier, and wherein resistances of the plurality of input resistors, a resistance of the summing resistor, and the gain value are selected to mitigate the noise.

In general, in one aspect, one or more embodiments relate to an input device, comprising: a plurality of capacitive sensor electrodes coupled to a noise source; an amplifier comprising: a plurality of input resistors receiving a plurality of reduced noise signals from a plurality of charge integrators; and a summing resistor at an output of the amplifier, the amplifier configured to generate a feedback signal at the output of the amplifier by amplifying each of a plurality of reduced noise signals using a gain value and a cardinality of the plurality of reduced noise signals, and the plurality of charge integrators configured to obtain a plurality of resulting signals from a plurality of capacitive sensor electrodes coupled to a noise source and generate the plurality of reduced noise signals by mitigating noise in the plurality of the resulting signals, at the plurality of charge integrators, using the feedback signal, wherein resistances of the plurality of input resistors, a resistance of the summing resistor, and the gain values are selected to mitigate the noise; and a controller configured to determine an input object is proximate to at least one of the plurality of capacitive sensor electrodes based on at least one of the plurality of reduced noise signals.

BRIEF DESCRIPTION OF DRAWINGS

The present embodiments are illustrated by way of example and are not intended to be limited by the figures of the accompanying drawings.

DETAILED DESCRIPTION

The following detailed description is merely exemplary in nature, and is not intended to limit the disclosed technology or the application and uses of the disclosed technology. Furthermore, there is no intention to be bound by any expressed or implied theory presented in the preceding technical field, background, or the following detailed description.

In the following detailed description of embodiments, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Figure 1:
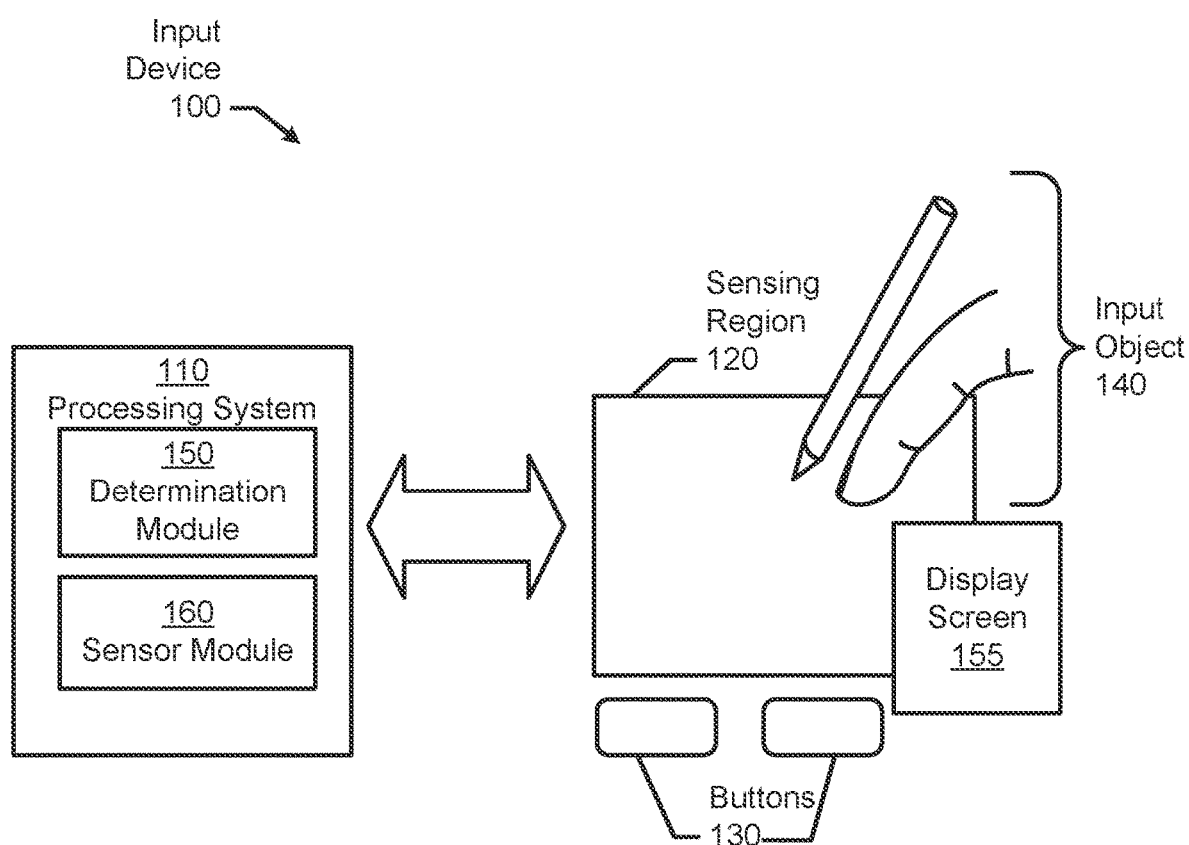
FIG. 1 shows a block diagram of an input device in accordance with one or more embodiments.

Turning now to the figures, FIG. 1 shows a block diagram of an exemplary input device (100), in accordance with embodiments of the disclosure. The input device (100) may be configured to provide input to an electronic system (not shown for simplicity). As used in this document, the term "electronic system" (or "electronic device") broadly refers to any system capable of electronically processing information. Examples of electronic systems may include personal computers of all sizes and shapes (e.g., desktop computers, laptop computers, netbook computers, tablets, web browsers, e-book readers, and personal digital assistants (PDAs)), composite input devices (e.g., physical keyboards, joysticks, and key switches), data input devices (e.g., remote controls and mice), data output devices (e.g., display screens and printers), remote terminals, kiosks, video game machines (e.g., video game consoles, portable gaming devices, and the like), communication devices (e.g., cellular phones, such as smart phones), and media devices (e.g., recorders, editors, and players such as televisions, set-top boxes, music players, digital photo frames, and digital cameras). Additionally, the electronic system could be a host or a slave to the input device.

The input device (100) may be implemented as a physical part of the electronic system. In the alternative, the input device (100) may be physically separate from the electronic system. The input device (100) may be coupled to (and communicate with) components of the electronic system using various wired or wireless interconnections and communication technologies, such as buses and networks. Example technologies may include Inter-Integrated Circuit (I2C), Serial Peripheral Interface (SPI), PS/2, Universal Serial Bus (USB), Bluetooth®, Infrared Data Association (IrDA), and various radio frequency (RF) communication protocols defined by the IEEE 802.11 or other standards.

In the example of FIG. 1, the input device (100) may correspond to a proximity sensor device (such as a "touchpad" or a "touch sensor device") configured to sense input provided by one or more input objects (140) in a sensing region (120). Example input objects include fingers and styli. The sensing region (120) may encompass any space above, around, in and/or near the input device (100) in which the input device (100) is able to detect user input (e.g., provided by one or more input objects (140)). The sizes, shapes, and locations of particular sensing regions may vary depending on actual implementations.

In some embodiments, the sensing region (120) detects inputs involving no physical contact with any surfaces of the input device (100). In other embodiments, the sensing region (120) detects inputs involving contact with an input surface (e.g., a touch screen) of the input device (100) coupled with some amount of applied force or pressure.

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques. The input device (100) may also include one or more physical or virtual buttons (130) to collect user input.

In some embodiments, the input device (100) may utilize capacitive sensing technologies to detect user input. For example, the sensing region (120) may input one or more capacitive sensing elements (e.g., sensor electrodes) to create an electric field. The input device (100) may detect inputs based on changes in the capacitance of the sensor electrodes. More specifically, an object in contact with (or in close proximity to) the electric field may cause changes in the voltage and/or current in the sensor electrodes. Such changes in voltage and/or current may be detected as "signals" indicative of user input. The sensor electrodes may be arranged in arrays or other regular or irregular patterns of capacitive sensing elements to create electric fields. In some implementations, some sensing elements may be ohmically shorted together to form larger sensor electrodes. Some capacitive sensing technologies may utilize resistive sheets that provide a uniform layer of resistance.

Some capacitive sensing technologies may be based on "self capacitance" (also referred to as "absolute capacitance") and/or mutual capacitance (also referred to as "trans-capacitance"). Absolute capacitance sensing methods detect changes in the capacitive coupling between sensor electrodes and an input object. Trans-capacitance sensing methods detect changes in the capacitive coupling between sensor electrodes. For example, an input object near the sensor electrodes may alter the electric field between the sensor electrodes, thus changing the measured capacitive coupling of the sensor electrodes. In some embodiments, the input device (100) may implement trans-capacitance sensing by detecting the capacitive coupling between one or more transmitter sensor electrodes (also "transmitter electrodes" or "transmitter") and one or more receiver sensor electrodes (also "receiver electrodes" or "receiver"). The resulting signal received by a receiver electrode may be affected by environmental interference (e.g., other electromagnetic signals) as well as input objects in contact with, or in close proximity to, the sensor electrodes.

The processing system (110) may be configured to operate the hardware of the input device (100) to detect input in the sensing region (120). The processing system (110) may include parts of, or all of, one or more integrated circuits (ICs) and/or other circuitry components. In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators, etc. For example, the processing system (110) may be part of an integrated touch and display controller.

In some embodiments, the processing system (110) may include determination circuitry (150) configured to determine when at least one input object is in a sensing region, determine signal to noise ratio, determine positional information of an input object, identify a gesture, determine an action to perform based on the gesture, a combination of gestures or other information, and/or perform other operations. In some embodiments, the processing system (110) may include sensor circuitry (160) configured to drive the sensing elements to transmit transmitter signals and receive the resulting signals. In some embodiments, the sensor circuitry (160) may include sensory circuitry that is coupled to the sensing elements. The sensory circuitry may include, for example, a transmitter module including transmitter circuitry that is coupled to a transmitting portion of the sensing elements and a receiver module including receiver circuitry coupled to a receiving portion of the sensing elements.

Although FIG. 1 shows only determination circuitry (150) and sensor circuitry (160), alternative or additional circuitry may exist in accordance with one or more embodiments of the disclosure.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g., to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. A baseline is an estimate of the raw measurements of the sensing region when an input object is not present. For example, a capacitive baseline is an estimate of the background capacitance of the sensing region. Each sensing element may have a corresponding individual value in the baseline. As yet further examples, the processing system (110) may determine positional information, recognize inputs as commands, recognize handwriting, and the like.

In some embodiments, the input device (100) includes a touch screen interface, and the sensing region (120) overlaps at least part of an active area of a display screen (155). The input device (100) may include substantially transparent sensor electrodes overlaying the display screen (155) and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may be configured for both display updating and input sensing. As another example, the display screen (155) may be operated in part or in total by the processing system (110).

The sensing region (120) and the display screen (155) may be integrated and follow on-cell or in-cell or hybrid architectures. In other words, display screen (155) may be composed of multiple layers (e.g., one or more polarizer layers, color filter layers, color filter glass layers, thin film transistor (TFT) circuit layers, liquid crystal material layers, TFT glass layers, etc.). The sensor electrodes may be disposed on one or more of the layers. For example, the sensor electrodes may be disposed on the TFT glass layer and/or the color filter glass layer. Moreover, the processing system (110) may be part of an integrated touch and display controller that operates both the display functions and the touch sensing functions.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores or micro-cores of a processor. Further, one or more elements of one or more embodiments may be located at a remote location and connected to the other elements over a network. Further, embodiments may be implemented on a distributed system having several nodes, where each portion of the disclosure may be located on a different node within the distributed system. In one embodiment, the node corresponds to a distinct computing device. Alternatively, the node may correspond to a computer processor with associated physical memory. The node may alternatively correspond to a computer processor or micro-core of a computer processor with shared memory and/or resources.

While FIG. 1 shows a configuration of components, other configurations may be used without departing from the scope of the disclosure. For example, various components may be combined to create a single component. As another example, the functionality performed by a single component may be performed by two or more components.

Figure 2:
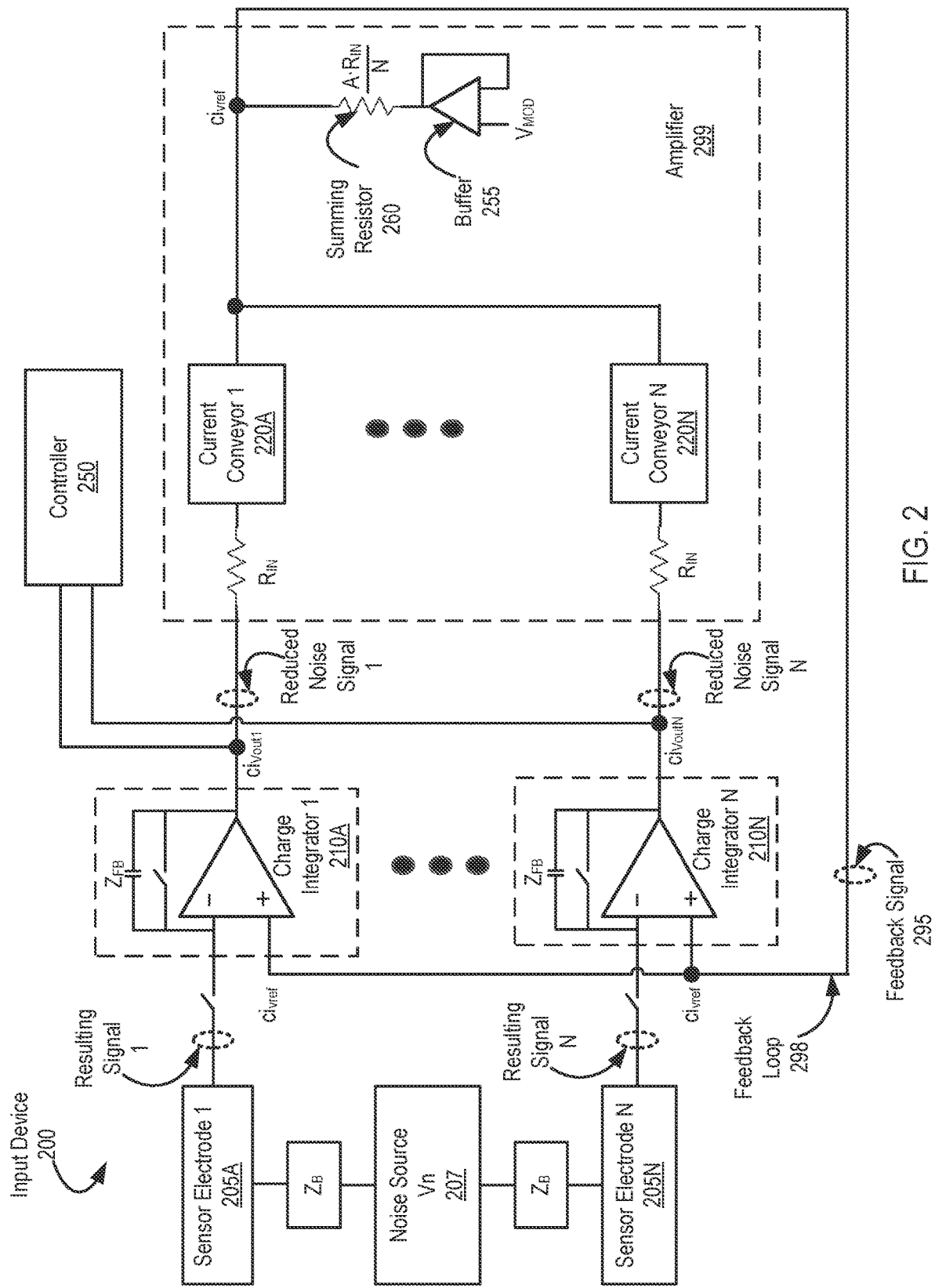
FIG. 2 shows an input device with a noise suppression circuit in accordance with one or more embodiments.

FIG. 2 shows an input device (200) in accordance with one or more embodiments. The input device (200) may correspond to input device (100), discussed above in reference to FIG. 1. As shown in FIG. 2, the input device (200) includes multiple touch sensor electrodes (e.g., sensor electrode 1 (205A), sensor electrode N (205N)), multiple charge integrators (charge integrator 1 (210A), charge integrator N (210N)), and an amplifier (299). The output of the amplifier (299) is coupled to the charge integrators (210A, 210N) by a feedback loop (298).

As discussed above, the input device (200) includes multiple sensor electrodes (205A, 205N). The multiple sensor electrodes (205A, 205N) may be used to perform any type of capacitive sensing (e.g., absolute capacitance sensing, trans-capacitance sensing, etc.). The output of each sensor electrode (205A, 205N) is a resulting signal (e.g., resulting signal 1, resulting signal N) which reflects the presence of an input object, if any, proximate to the capacitive sensor electrode (205A, 205N).

In one or more embodiments, input device (200) includes a noise source (207). The noise source (207) may correspond to any common mode noise (Vn). For example, the noise source (207) may generate noise (Vn) during the operation of a display screen (e.g., display screen (155), discussed above in reference to FIG. 1). Accordingly, the noise source (207) may be a display noise source. The noise source (207) may correspond, for example, to a cathode layer of an LED screen and/or a common electrode (VCOM) in an LCD screen. As shown in FIG. 2, the noise source (207) couples to the touch sensor electrodes (205A, 205N). In other words, the resulting signal (e.g., resulting signal 1, resulting signal N) from each sensor electrode (205A, 205N) may include some component of the noise (Vn) of the noise source (207). In one or more embodiments, the coupling between the display noise source (207) and each sensor electrode (205A, 205N) may be modeled as impedance $Z_B$. For example, $Z_B$ may be a resistor ($R_B$) and a capacitor ($C_B$) in series: $Z_B = R_B + 1/(sC_B)$.

As discussed above, the input device (200) includes multiple charge integrators (210A, 210N). There may be one charge integrator for each of the sensor electrodes (205A, 205N). Moreover, each charge integrator and its corresponding sensor electrode may form, at least in part, a channel. As shown in FIG. 2, each charge integrator (210A, 210N) inputs both a resulting signal from the corresponding sensor electrode (205A, 205N) and a feedback signal (295) from the output of the amplifier (299). The feedback signal (295) propagates along the feedback loop (298). Further, each charge integrator may be implemented as an operational amplifier in parallel with a switch and a feedback impedance $Z_{FB}$ (e.g., $Z_{FB} = 1/(sC_{FB})$). $C_B$ may be much larger than $C_{FB}$ (CB>>$C_{FB}$), and thus $Z_{FB}$ is much larger than $Z_B$ ($Z_{FB}$>>$Z_B$). The output of each charge integrator (210A, 210N) is a reduced noise signal (e.g., reduced noise signal 1, reduced noise signal N). As shown in FIG. 2, the reduced noise signals are inputs to both the controller (250) and the amplifier (299).

As discussed above, the input device (200) includes an amplifier (299). The amplifier (299) may amplify (e.g., scale) each reduced noise signal (i.e., reduced noise signal 1, reduce noise signal N) by a factor of −A/N, where N is the number (i.e., cardinality) of reduced noise signals (i.e., number of channels), and where A is a gain value. As shown in FIG. 2, the amplifier (299) may be implemented with multiple input resistors ($R_{IN}$) and multiple current conveyors (current conveyor 1 (220A), current conveyor N (220N)). Specifically, there may be one input resistor ($R_{IN}$) and one current conveyor (220A, 220N) per reduced noise signal (i.e., per channel). The amplifier (299) may also include a buffer (255) storing value $V_{MOD}$, and a summing resistor (260) with a resistance of $A \times R_{IN} \times (1/N)$.

In one or more embodiments, the input device (200) includes the controller (250). The controller (250) is configured to determine, based on the output of one or more charge integrators (210A, 210N), the position of an input object(s), if any, in a sensing region defined by the sensor electrode (205A, 205N) (e.g., sensing region (120), discussed above in reference to FIG. 1). The controller (250) may be implemented in hardware (i.e., circuits), software, or any combination thereof. The controller (250) may correspond to either a touch controller that operates the touch sensing functions or an integrated touch and display controller that operates both the display functions and the touch sensing functions.

In one or more embodiments, the amplifier (299) and the feedback loop (298), when coupled to the charge integrators (210A, 210N), form a noise suppression circuit. Specifically, without the noise suppression circuit, the noise gain ($ci_{VOUT}$/Vn) is: $ci_{VOUT}/Vn = Z_{FB}/Z_B$. Since $Z_{FB}$>>$Z_B$, the noise gain is larger than one. Accordingly, without the noise suppression circuit, the controller (250) processes a very noisy signal, which could lead to incorrect output results (e.g., detecting an input object when no input object is present, determining the wrong location of an input object, etc.). However, when the noise suppression circuit is present, the noise gain ($ci_{VOUT}$/Vn) may be determined as: $ci_{VOUT}/Vn = -(Z_{FB}/Z_B) \times 1/(A+1+AZ_{FB}/Z_B)$. In many embodiments, A is much larger than 1 (i.e., A>>1), and the noise gain may be approximated as: $ci_{VOUT}/Vn = (-1/A) \times (Z_{FB}/Z_B) \times 1/(1+Z_{FB}1/Z_B)$. Substituting $Z_B = R_B + 1/(sC_B)$ and $Z_{FB} = 1/(sC_{FB})$, $ci_{VOUT}/Vn = (-1/A) \times C_B \times 1/(C_B + C_{FB}) \times 1/(1+sR_BC_{FB}||C_B))$.

In other words, with the noise suppression circuit, the noise (Vn) may be mitigated by $1/A \times 1/(1+Z_{FB}/Z_B)$ before processing by the controller (250). Since $Z_{FB}$>>$Z_B$, the attenuation may be approximated as $1/A \times Z_B/Z_{FB}$. Other common mode noise including the common mode component of global coarse baseline cancellation (GCBC) will also be attenuated by the noise suppression circuit. As the touch sensor processor (250) is processing a less noisy signal, it is less likely that the output results of the touch sensor processor will be incorrect.

In one or more embodiments, with the noise suppression circuit, the signal transfer function for the channel proximate to an input object ($ci_{VOUT1}$) may be approximated as: $ci_{VOUT1} = \Delta C_B (1-1/N) V_{MOD}$, where $\Delta C_B$ is the change in capacitance between the display noise source (207) and the sensor electrode due to the input object, and $V_{MOD}$ is the modulation voltage in the buffer (255). The signal transfer functions for the remaining channels $ci_{VOUTX, X \neq 1}$ (i.e., the channels not proximate to the input object) may be approximated as: $ci_{VOUTX, X \neq 1} = (-1/N) \times \Delta C_B \times V_{MOD}$. In other words, the touched tixel shows almost full response and untouched tixels show a small response in the oppose direction.

The above description is in the context of absolute capacitance (or self-capacitance) sensing. This circuit also applies to trans-capacitance (or mutual capacitance) sensing. In trans-capacitance, $V_{MOD}$ is typically held at a constant voltage (e.g. VDD/2), a transmitter with voltage swing Vtx drives trans-capacitance, and proximity is detected by measuring a change in $C_t$, or $\Delta C_t$. The suppression of noise Vn follows the same equation: $ci_{VOUT}/Vn = (-1/A) \times C_B \times 1/(C_B + C_{FB}) \times 1/(1+sR_BC_{FB}||C_B))$. The signal transfer function for a touch tixel is $ci_{VOUT1} = -\Delta C_t (1-1/N) V_{tx}$, and $ci_{VOUTX, X \neq 1} = 1/N \times \Delta C_t \times V_{tx}$ for untouched tixels.

Figure 3:
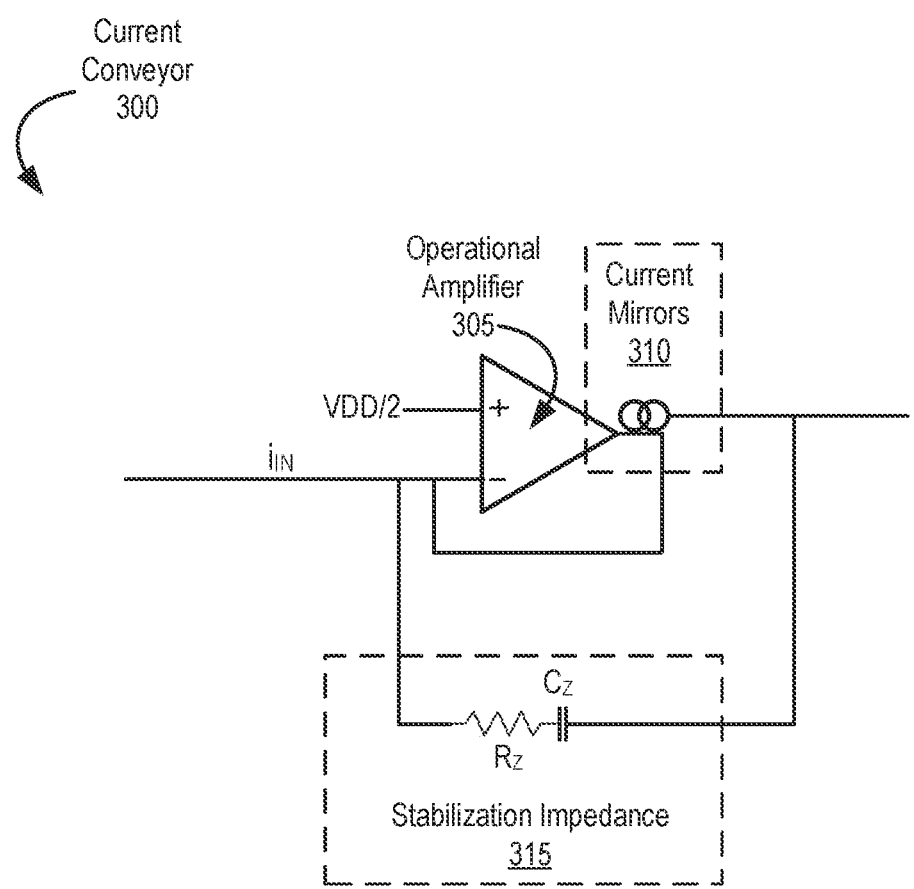
FIG. 3 shows a current conveyor in accordance with one or more embodiments.

FIG. 3 shows a current conveyor (300) in accordance with one or more embodiments. The current conveyor (300) may correspond to any of the current conveyors (220A, 220N) discussed above in reference to FIG. 2. As shown in FIG. 3, the current conveyor (300) may include an operational amplifier (305) and one or more current mirrors (310) coupled to an output of the operational amplifier (305). Those skilled in the art, having the benefit of this detailed description, will appreciate that the input current to the current conveyor (300) and the output current from the current conveyor (300) may be identical or substantially identical in magnitude, but opposite in direction.

In one or more embodiments, the noise suppression circuit includes 4 poles: the dominant pole in the operational amplifier of a charge integrator, the pole at $ci_{VOUT}$, the pole at $i_{IN}$ of the current conveyor (300), and the pole at $ci_{VREF}$ (shown in FIG. 2). In one or more embodiments, in order to stabilize the loop, a stabilization impedance (315) including resistor $R_Z$ and a capacitor $C_Z$ is added as shown in FIG. 3. This creates a pole and a zero in the current conveyor. The pole is typically dominant with A>>1, which narrow bands the loop. The zero gives a phase boost to get enough phase margin.

Those skilled in the art, having the benefit of this detailed description, will appreciate that there are other ways to stabilize the loop without using $R_Z$ and $C_Z$. For example, stabilizing the loop may be achieved by increasing the compensation capacitor in the charge integrator, which effectively moves the dominant pole to a lower frequency.

Figure 4:
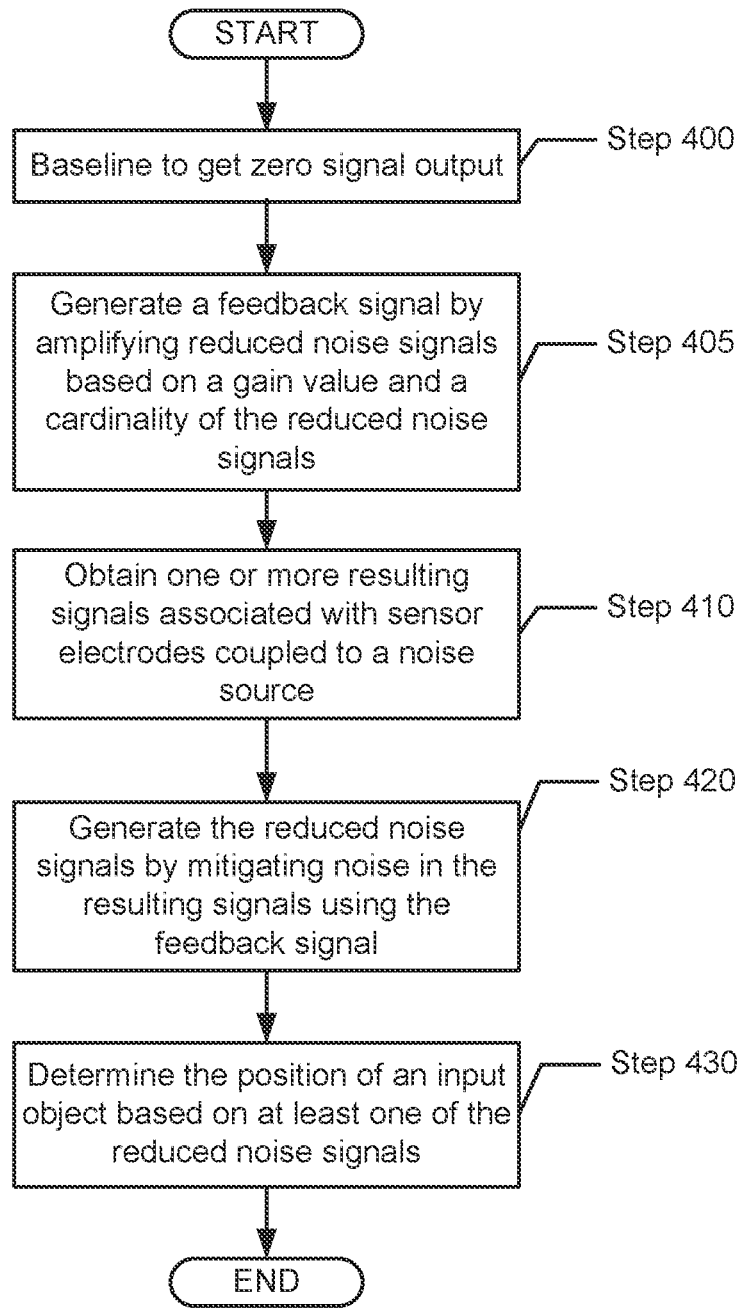
FIG. 4 shows a flowchart in accordance with one or more embodiments.

FIG. 4 shows a flowchart in accordance with one or more embodiments. The flowchart of FIG. 4 depicts a method for operating an input device (e.g., input device (200)). One or more of the steps in FIG. 4 may be performed by the components of the input device (200), discussed above in reference to FIG. 2. In one or more embodiments, one or more of the steps shown in FIG. 4 may be omitted, repeated, and/or performed in a different order than the order shown in FIG. 4. Accordingly, the scope of the invention should not be considered limited to the specific arrangement of steps shown in FIG. 4.

Initially, baselining is performed to get a zero signal output at $ci_{VOUT}$ (STEP 400). In other words, $ci_{VOUT}$ is measured without touch and without amplifier feedback (i.e., A=0), but with $V_{MOD}$ active. Under such conditions, the measured $ci_{VOUT}$ reflects the fixed capacitance in the sensor. A coarse baseline cancellation (CBC) circuit (not shown) may be used to remove the fixed capacitance in the sensor so net changes in capacitance can be more easily detected. In one or more embodiments, following execution of STEP 400, the input device is ready for interaction (e.g., touch sensing) with a user.

In STEP 405, a feedback signal is generated. The feedback signal is generated by amplifying reduced noise signals based on a gain value and a cardinality of the reduced noise signals (i.e., the number of reduced noise signals). The gain between the output of each charge integrator and the output of the loop (i.e., $civ_{REF}$) is $(-g_m R_L) \times 1/(1+g_m R_{IN})$, where $R_L$ is the resistance of the summing resistor (260). For $g_m R_{IN} >> 1$, this gain may be approximated as $-R_L/R_{IN}$. For N channels with a common mode noise signal, the gain becomes $-N \times R_1/R_{IN}$. By setting $R_L = A \times R_{IN} \times (1/N)$ (as shown in FIG. 2), the gain becomes –A for N channels or –A/N for each channel, where N is the cardinality of the reduced noise signals (i.e., the cardinality of the channels). The amplifier may be implemented with multiple current conveyors and a single summing resistor. The feedback signal is the output of the amplifier.

In STEP 410, one or more resulting signals are obtained. The resulting signals are associated with sensor electrodes involved in any type of capacitive sensing. There may be coupling between the sensor electrodes a noise source (e.g., display noise source). Accordingly, the resulting signals may include a component of the noise source and reflect the presence of an input object, if any, proximate the sensor electrodes.

In STEP 420, the reduced noise signals are generated by mitigating the noise in the resulting signals using the feedback signals. For example, the resulting signals and the feedback signal may be inputs to charge integrators. Each charge integrator may integrate a difference between one of the resulting signals and the feedback signal. The output of a charge integrator is a reduced noise signal. The feedback loop, the amplifier, and the charge integrators effective act as a noise suppression circuit.

In STEP 430, the position of an input object is determined based on one or more of the reduced noise signals. Because of the noise suppression circuit, the noise has been mitigated in the reduced noise signal(s), and it is less likely that an error (e.g., detecting a input object when no input object is present, detecting a input object in the wrong position, etc.) will result.

Thus, the embodiments and examples set forth herein were presented in order to best explain various embodiments and their particular application(s) and to thereby enable those skilled in the art to make and use the embodiments. However, those skilled in the art will recognize that the foregoing description and examples have been presented for the purposes of illustration and example only. The description as set forth is not intended to be exhaustive or to be limiting to the precise form disclosed.

While many embodiments have been described, those skilled in the art, having benefit of this disclosure, will appreciate that other embodiments can be devised which do not depart from the scope.

What is claimed is:

1. A processing system comprising: an amplifier comprising: a plurality of input resistors receiving a plurality of reduced noise signals from a plurality of charge integrators; and a summing resistor at an output of the amplifier, the amplifier configured to generate a feedback signal at the output of the amplifier by amplifying each of a plurality of reduced noise signals using a gain value and a cardinality of the plurality of reduced noise signals, and the plurality of charge integrators configured to: obtain a plurality of resulting signals from a plurality of capacitive sensor electrodes coupled to a noise source, and generate the plurality of reduced noise signals by mitigating noise in the plurality of the resulting signals, at the plurality of charge integrators, using the feedback signal, wherein resistances of the plurality of input resistors, a resistance of the summing resistor, and the gain value are selected to mitigate the noise.

2. The processing system of claim 1, wherein:
each of the resistances of the plurality of input resistors is R,
the gain value is A,
the cardinality of the plurality of reduced noise signals is N,
the resistance of the summing resistor is $A \times R \times (1/N)$, and
the amplifier amplifies each of the plurality of reduced noise signals by –A/N.

3. The processing system of claim 1, further comprising:
a controller configured to determine an input object is proximate to one or more of the plurality of capacitive sensor electrodes based on at least one of the plurality of reduced noise signals.

4. The processing system of claim 3, wherein the noise source is associated with a display that is also operated by the controller.

5. The processing system of claim 1, wherein the amplifier comprises:
a plurality of current conveyors between the plurality of input resistors and the summing resistor.

6. The processing system of claim 5, wherein each of the plurality of current conveyors comprises:
an operational amplifier;
a plurality of current mirrors coupled to an output of the operational amplifier; and
a stabilization impedance coupled to an input of the operational amplifier.

7. The processing system of claim 1, wherein the amplifier further comprises:
a buffer coupled to the summing resistor and configured to store a modulation voltage.

8. The processing system of claim 1, wherein:
each of the plurality of capacitive sensor electrodes are coupled to the noise source by a first impedance;
each of the plurality of charge integrators comprises an operational amplifier in parallel with a second impedance; and
the feedback signal is coupled to a non-inverting input of each of the plurality of charge integrators.

9. A method, comprising:
generating, by an amplifier, a feedback signal by amplifying each of a plurality of reduced noise signals based on a gain value and a cardinality of the plurality of reduced noise signals;
obtaining a plurality of resulting signals from a plurality of capacitive sensor electrodes coupled to a noise source; and
generating, by a plurality of charge integrators, the plurality of reduced noise signals by mitigating noise in the plurality of resulting signals using the feedback signal,
wherein the amplifier comprises:
a plurality of input resistors receiving the plurality of reduced noise signals from the plurality of charge integrators; and
a summing resistor at an output of the amplifier, and
wherein resistances of the plurality of input resistors, a resistance of the summing resistor, and the gain value are selected to mitigate the noise.

10. The method of claim 9, wherein:
each of the resistances of the plurality of input resistors is R,
the gain value is A,
the cardinality of the plurality of reduced noise signals is N,
the resistance of the summing resistor is A×R×(1/N), and
the amplifier amplifies each of the plurality of reduced noise signals by −A/N.

11. The method of claim 9, further comprising:
determining, by a controller, an input object is proximate to one of the plurality of capacitive sensor electrodes based on at least one of the plurality of reduced noise signals.

12. The method of claim 9, wherein the amplifier comprises:
a plurality of current conveyors between the plurality of input resistors and the summing resistor.

13. The method of claim 12, wherein each of the plurality of current conveyors comprises:
an operational amplifier;
a plurality of current mirrors coupled to an output of the operational amplifier; and
a stabilization impedance coupled to an input of the operational amplifier.

14. An input device, comprising: a plurality of capacitive sensor electrodes coupled to a noise source; an amplifier comprising: a plurality of input resistors receiving a plurality of reduced noise signals from a plurality of charge integrators, and a summing resistor at an output of the amplifier, the amplifier configured to generate a feedback signal at the output of the amplifier by amplifying each of a plurality of reduced noise signals using a gain value and a cardinality of the plurality of reduced noise signals, and the plurality of charge integrators configured to: obtain a plurality of resulting signals from a plurality of capacitive sensor electrodes coupled to a noise source, and generate the plurality of reduced noise signals by mitigating noise in the plurality of the resulting signals, at the plurality of charge integrators, using the feedback signal, wherein resistances of the plurality of input resistors, a resistance of the summing resistor, and the gain value are selected to mitigate the noise; and a controller configured to determine an input object is proximate to at least one of the plurality of capacitive sensor electrodes based on at least one of the plurality of reduced noise signals.

15. The input device of claim 14, wherein:
each of the resistances of the plurality of input resistors is R,
the gain value is A,
the cardinality of the plurality of reduced noise signals is N,
the resistance of the summing resistor is A×R×(1/N), and
the amplifier amplifies each of the plurality of reduced noise signals by −A/N.

16. The input device of claim 14, wherein the noise source is associated with a display that is also operated by the controller.

17. The input device of claim 14, wherein the amplifier comprises:
a plurality of current conveyors between the plurality of input resistors and the summing resistor.

18. The input device of claim 17, wherein each of the plurality of current conveyors comprises:
an operational amplifier;
a plurality of current mirrors coupled to an output of the operational amplifier; and
a stabilization impedance coupled to an input of the operational amplifier.

19. The input device of claim 14, wherein the amplifier further comprises:
a buffer coupled to the summing resistor and configured to store a modulation voltage.

20. The input device of claim 14, wherein:
each of the plurality of capacitive sensor electrodes are coupled to the noise source by a first impedance;
each of the plurality of charge integrators comprises an operational amplifier in parallel with a second impedance; and
the feedback signal is coupled to a non-inverting input of each of the plurality of charge integrators.

* * * * *